US011973700B2

(12) United States Patent
Zhou et al.

(10) Patent No.: US 11,973,700 B2
(45) Date of Patent: Apr. 30, 2024

(54) TRUSTED REMOTE MANAGEMENT UNIT

(71) Applicant: Marvell Asia Pte Ltd, Singapore (SG)

(72) Inventors: Chuanhai Zhou, Shanghai (CN); Lian Xie, Palo Alto, CA (US); Hong Yu Chou, Saratoga, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 425 days.

(21) Appl. No.: 17/469,904

(22) Filed: Sep. 9, 2021

(65) Prior Publication Data

US 2022/0078138 A1 Mar. 10, 2022

(30) Foreign Application Priority Data

Sep. 10, 2020 (CN) ......................... 202010947976.5

(51) Int. Cl.

| | |
|---|---|
| ***H04L 49/00*** | (2022.01) |
| ***H04L 9/06*** | (2006.01) |
| ***H04L 9/08*** | (2006.01) |
| ***H04L 49/35*** | (2022.01) |

(52) U.S. Cl.

CPC .............. *H04L 49/70* (2013.01); *H04L 9/065* (2013.01); *H04L 9/0822* (2013.01); *H04L 9/0825* (2013.01); *H04L 49/35* (2013.01)

(58) Field of Classification Search

CPC ......... H04L 49/70; H04L 49/35; H04L 9/065; H04L 9/0822; H04L 9/0825

See application file for complete search history.

(56) References Cited

U.S. PATENT DOCUMENTS

| | | | | |
|---|---|---|---|---|
| 7,876,746 | B1 | 1/2011 | Pannell et al. | |
| 8,782,414 | B2 * | 7/2014 | Patiejunas | H04L 9/3273 713/153 |
| 2010/0138900 | A1 * | 6/2010 | Peterka | H04L 12/2812 726/4 |

OTHER PUBLICATIONS

"Industrial Communication Networks—Overview," plc247.com, pp. 1-17, year 2021, as downloaded from https://plc247.com/industrial-communication-networks-overview/.

* cited by examiner

*Primary Examiner* — Elton Williams

(57) ABSTRACT

A network switch includes a plurality of ports for communicating over a network. Processing circuitry processes inbound frames received from the network via the ports and sends outbound frames to the network. Remote management circuitry (RMU) is responsive to commands received from a host device external to the network switch. The RMU receives via one of the ports a remote access request frame from the host device, wherein at least part of the remote access request frame is encrypted, and decrypts the remote access request frame. In response to successful decryption of the part of the remote access request frame, the RMU accesses one or more configuration registers of the network switch in accordance with the remote access request frame, composes a remote access response frame, at least a portion of the remote access response frame being encrypted, and sends the remote access response frame to the host device.

17 Claims, 6 Drawing Sheets

TRUSTED REMOTE MANAGEMENT UNIT

FIELD OF THE INVENTION

The present invention relates generally to data communications, and particularly to methods, systems and devices for remote management of network switches.

BACKGROUND

It is often desirable to manage a network switch remotely, i.e., from a location other than the location of the network switch. Such management can be carried out by reading to and writing from memories, such as configuration registers, storing address and management information databases in the network switch.

For this purpose, for example, U.S. Pat. No. 7,876,746, whose disclosure is incorporated herein by reference, describes remote management for network switches, which enables an administrator at one location to manage a network switch at another location over a network or to manage a local network switch device. In some embodiments, frames such as Ethernet frames are used to access memories within the switch, for example to perform such management functions as altering the switch configuration, reading the management information base (MIB), and reading and writing the address database, without the need for a central processing unit (CPU). This approach can be used to simplify, and in some cases even eliminate the CPU and any associated components from a physically remote network switch.

SUMMARY

Embodiments of the present invention that are described hereinbelow provide improved network switches and methods for operation of such switches.

There is therefore provided, in accordance with an embodiment of the invention, a network switch, including a plurality of ports for communicating over a network. Processing circuitry, separate from a central processing unit (CPU), is configured to process inbound frames received from the network via the ports and to send outbound frames to the network via the ports. Remote management circuitry (RMU) is responsive to commands received from a host device external to the network switch and is separate from the CPU. The RMU is configured to receive via one of the ports a remote access request frame from the host device, wherein at least part of the remote access request frame is encrypted, to decrypt the remote access request frame, and in response to successful decryption of the part of the remote access request frame, to access, independently of accessing any CPU, one or more configuration registers of the network switch in accordance with the remote access request frame, compose a remote access response frame, at least a portion of the remote access response frame being encrypted, and send the remote access response frame to the host device.

In a disclosed embodiment, the remote management circuitry is configured to decrypt the part of the remote access request frame, and to encrypt the portion of the remote access response frame, independently of any CPU.

Additionally or alternatively, the network switch is disposed on one or more integrated circuits that are absent CPU circuitry.

In some embodiments, the remote access request frame further carries authentication information, and the remote management circuitry is configured to authenticate the host device using the authentication information, and to compose the remote access response frame only in response to both (i) successful decryption of the part of the remote access request frame, and (ii) successful authentication of the host device.

In a disclosed embodiment, the remote management circuitry is configured to authenticate the host device using an asymmetric ciphering scheme and to decrypt one or more subsequent remote access request frames using a symmetric ciphering scheme. In one embodiment, the remote management circuitry is configured to extract a public encryption key of the host device from the remote access request frame, to generate a symmetric encryption key for use in encrypting and decrypting the one or more subsequent remote access request frames, to encrypt the symmetric encryption key using the public encryption key in the asymmetric ciphering scheme, and to transmit the encrypted symmetric encryption key to the host device in the remote access response frame.

In a disclosed embodiment, the network is an automotive network in a vehicle, and the remote management circuitry is configured to receive the remote access request frame from outside the vehicle or from within the vehicle. In alternative embodiments, the network is an industrial network or an enterprise network.

There is also provided, in accordance with an embodiment of the invention, a method for remote access in a network switch. The method includes receiving a remote access request frame from a host device external to the network switch, wherein at least part of the remote access request frame is encrypted. The remote access request frame is decrypted separately from any central processing unit (CPU). In response to successful decryption of the part of the remote access request frame, independently of accessing any CPU, one or more configuration registers of the network switch are accessed in accordance with the remote access request frame, a remote access response frame is composed, at least a portion of the remote access response frame is encrypted, and the remote access response frame is sent to the host device.

The present invention will be more fully understood from the following detailed description of the embodiments thereof, taken together with the drawings in which:

DETAILED DESCRIPTION OF EMBODIMENTS

Figure 1:
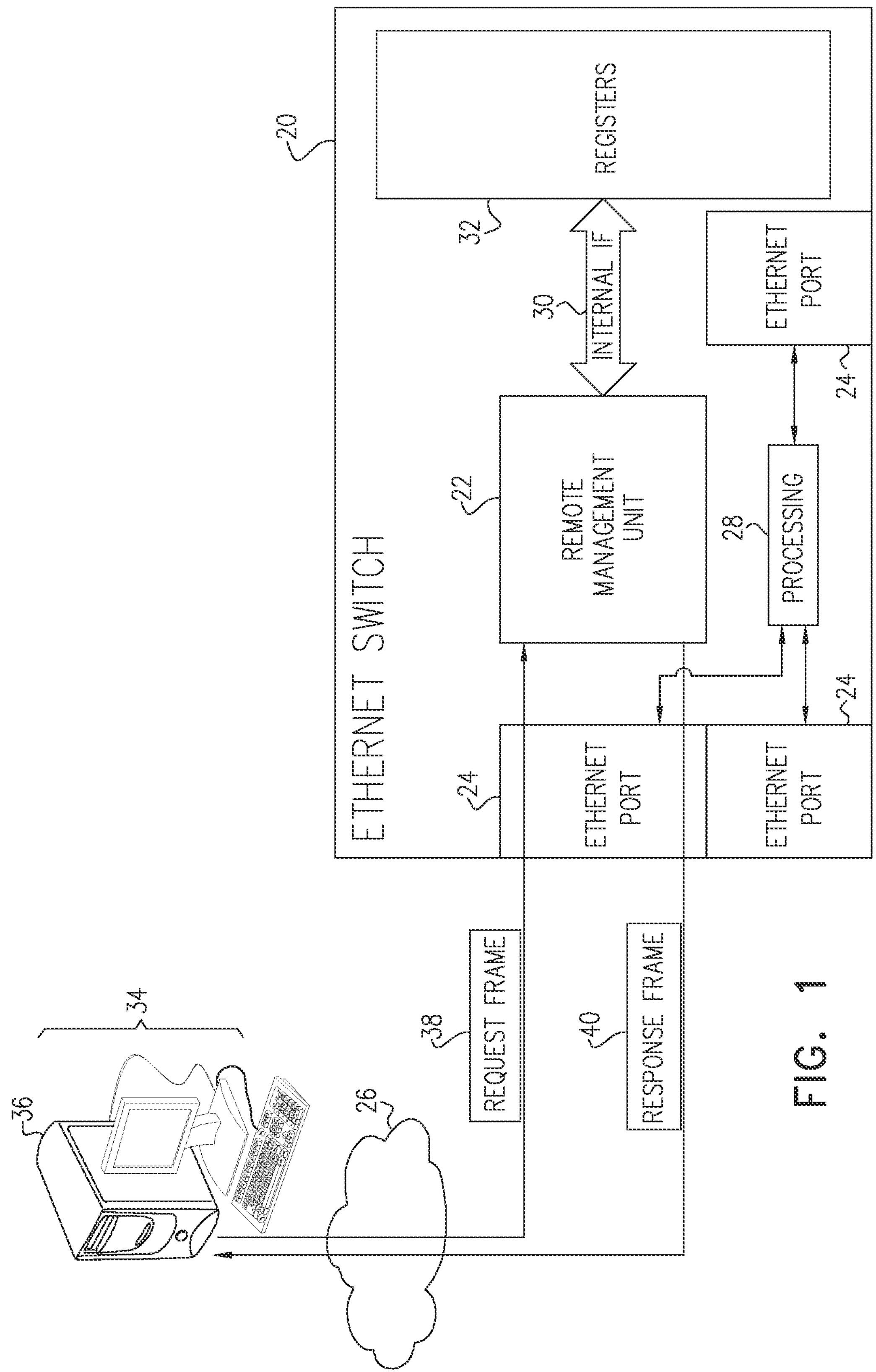
FIG. 1 is a block diagram that schematically illustrates a network switch with circuitry for remote management, in accordance with an embodiment of the invention.

A remote management unit (RMU, also referred to herein as "remote management circuitry") is a functional block in a network device, such as an Ethernet switch, that processes remote access request frames from external host devices and configures the network switch and/or returns configuration and status frames in response to the host devices. RMUs are deployed in many network devices, including switches used in automotive networks. They provide an efficient means for accessing registers in the network device and retrieving status information using standard network data packets, such as Ethernet frames. In typical operation, the RMU accepts a remote access request frame from an external host device, decodes the remote access request frame to configure the network device or to fetch device configuration and/or status information, and constructs a remote access response frame to convey the fetched device information back to the host that initiated the remote access request.

In some embodiments, remote access request frames include dedicated tags in their headers, which identify the frames as remote management frames. For example, the tags may have the form of Distributed Switch Architecture (DSA) tags, which are used in switches produced by Marvell Technology Inc. (Santa Clara, Calif.). Alternatively, other sorts of tag formats may be used for this purpose. A remote access request Ethernet frame directed to the RMU can thus be distinguished from normal traffic on the basis of the tag. Using Ethernet forwarding, remote management frames can be forwarded to and from any connected switch, meaning that a single host device can be used to control a single device or a bundle of devices either locally or remotely.

Without additional security protection on the remote access request and response frames, however, the contents of the frames will be fully observable by intermediate devices and can also be recovered from media over which they are transmitted. When the contents are observable, malicious devices can forge or manipulate remote access request and response frames to gain access to network devices without permission, which can be particularly dangerous in an automotive environment, as well as in other applications.

To protect remote access request and response frames from manipulation and eavesdropping by unauthenticated devices, embodiments of the present invention that are described herein provided a trusted access mechanism, which can be applied in the RMU of a network device to perform authentication of remote access request frames. This mechanism utilizes asymmetric cryptography, in which a source device uses a private key to encrypt information, and transmits a remote access request frame containing the corresponding public key and the encrypted information. Upon receiving the remote access request frame, the RMU uses a public key value (for example, a hash of the public key), which is stored in the network device, to verify the public key conveyed by the Ethernet frame, and it uses the public key to decrypt the information in the frame. The RMU then uses the public key to encrypt its own information, including a secret value that will subsequently be used as a symmetric encryption key. The RMU transmits this encrypted information in a remote access response frame to the source device, thus enabling subsequent secure communications, for example, setting up media access control security (MACsec), using the symmetric encryption key.

The various tasks of the RMU typically are performed solely in hardware or firmware, without accessing any CPU associated with the network device. Even when a network switch or other device comprises a CPU, the disclosed techniques can be used to offload remote management tasks from the CPU.

Thus, in the embodiments that are described herein, a network switch comprises multiple ports, for communicating over a network, and processing circuitry, which processes inbound frames received from the network via the ports and sends outbound frames to the network via the ports. The switch also comprises remote management circuitry, which responds to commands received from a host device external to the network switch. Both the processing circuitry and the remote management circuitry are implemented in hardware logic, which is separate from any CPU. In some embodiments, the network switch is disposed on one or more integrated circuits that are absent CPU circuitry.

In the disclosed embodiments, the remote management circuitry receives, via one of the ports, a remote access request frame from a host device, wherein at least part of the remote access request frame is encrypted. The remote management circuitry decrypts the remote access request frame. Upon successful decryption of part or all of the remote access request frame, the remote management circuitry accesses (independently of any CPU) one or more configuration registers of the network switch in accordance with the remote access request frame. The remote management circuitry composes a remote access response frame, at least a portion of which is encrypted, and sends the remote access response frame to the host device via one of the ports. In some embodiments, the remote management circuitry also decrypts the remote access request frame and encrypts at least the portion of the remote access response frame independently of any CPU.

In some embodiments, the remote access request frame further carries authentication information, which is used by the remote management circuitry in authenticating the host device. The remote management circuitry will compose the remote access response frame only in response to both (i) successful decryption of at least the relevant part of the remote access request frame, and (ii) successful authentication of the host device. In a disclosed embodiment, the remote management circuitry authenticates the host device using an asymmetric ciphering scheme but then decrypts subsequent remote access request frames using a symmetric ciphering scheme.

In one embodiment, the network switch communicates over an automotive network in a vehicle. In this embodiment, the remote management circuitry may receive the remote access request frame either from outside the vehicle or from within the vehicle. Alternatively, the remote management circuitry may be incorporated in switches and other network devices that communicate over other sorts of networks, such as industrial networks (i.e., networks adapted for exchanging real-time control data within industrial environments, such as manufacturing facilities and power plants, for example) or enterprise networks (for example, a local-area network or wide-area network linking together computers and peripheral devices within an organization).

Although the embodiments described herein are directed mainly at implementation on Ethernet networks using Ethernet frame formats, the principles of the present invention may similarly be implemented mutatis mutandis, in networks of other types, including both wired and wireless networks, using other packet formats. (The terms “frame” and “packet” are used interchangeably in the present patent application.)

FIG. 1 is a block diagram that schematically illustrates a network switch 20 with circuitry for remote management in the form of a remote management unit (RMU) 22, in accordance with an embodiment of the invention. In this embodiment, the components of network switch 20 are disposed on one or more integrated circuits, with no local CPU circuitry. (In an alternative embodiment, not shown in the figures, switch 20 contains a CPU for other purposes, but the remote management functions described herein are carried out independently of the CPU.) In the pictured example, switch 20 is configured as an Ethernet switch; but the principles of the present invention may similarly be applied, mutatis mutandis, in switches and networks of other types, as well as in other sorts of network devices that are subject to remote management.

Network switch 20 comprises multiple ports 24 for communicating over a network 26. (Although only a small number of ports are shown in FIG. 1 for the sake of simplicity, switch 20 may comprise a larger number of ports.) Processing circuitry 28 processes inbound frames received from network 26 via ports 24 and sends outbound frames to the network via the ports. Typically, each port 24 comprises physical layer (PHY) and media access control (MAC) interface circuits, while processing circuitry 28 comprises switching circuits, logic, and memory, as are known in the art. RMU 22 in switch 20 comprises hardware logic circuits and memory, which are described below in greater detail with reference to FIG. 4. RMU 22 is connected by an internal interface (IF) bus 30 to a set of registers 32, which store configuration and status information with respect to the setup and operation of switch 20.

In the pictured scenario, a host device 34, such as a computer having a CPU 36, sends a command in the form of a remote access request frame 38 via network 26 to switch 20. Host device 34 encrypts at least a part of request frame 38, for example command data in the frame payload. The host device sets a tag in the header of frame 38 to indicate that it is directed to RMU 22. On the basis of this tag, port 24 passes remote access request frame 38 to RMU 22. The RMU decrypts the encrypted part of frame 38 in order to authenticate host device 34 and decode the command data. In accordance with the command data, RMU 22 reads data from and/or writes data to registers 32 and then composes a remote access response frame 40. The RMU encrypts at least a portion of remote access response frame 40, for example the response data in the frame payload, and then sends the remote access response frame over network 26 to host device 34.

Figure 2:
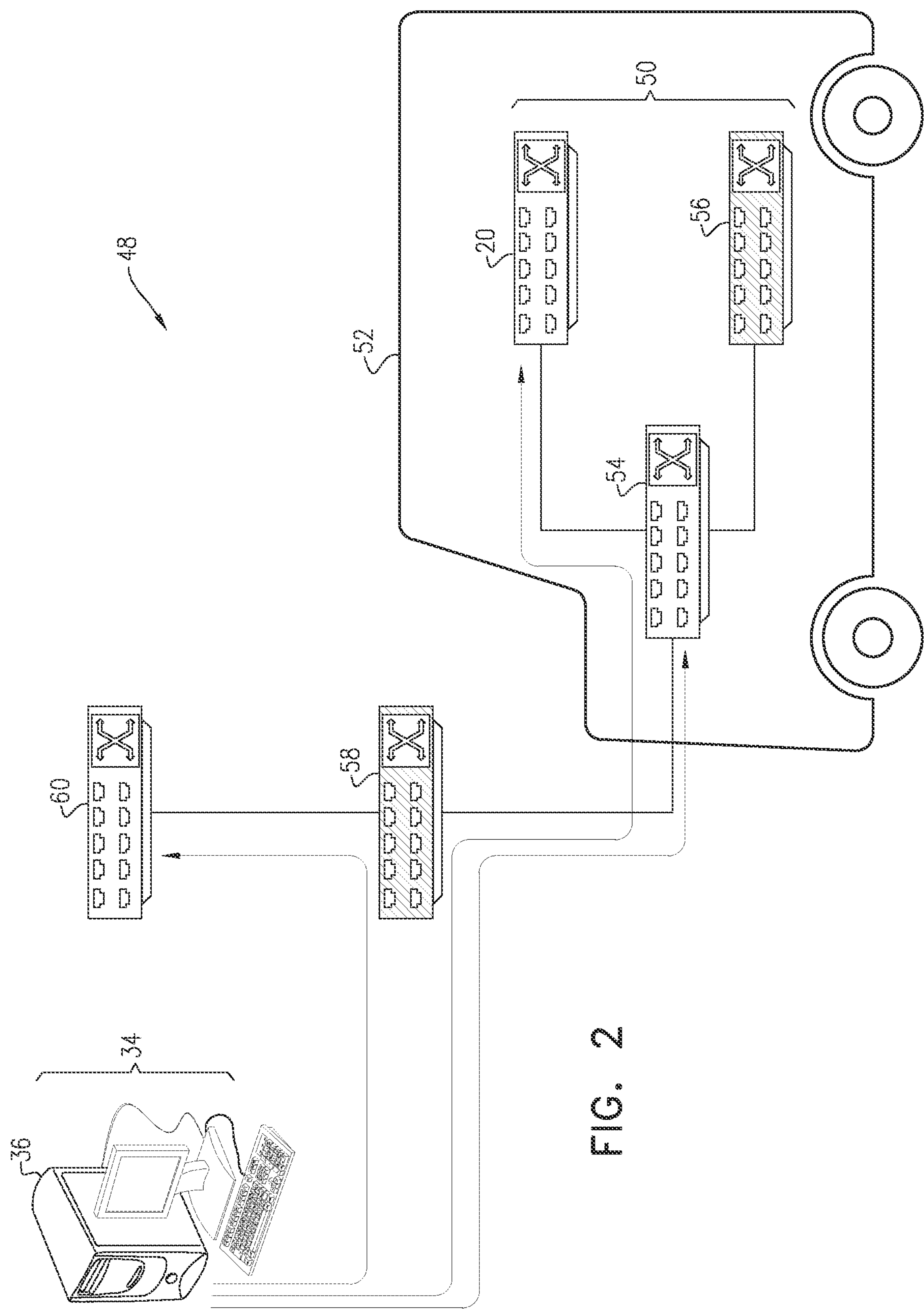
FIG. 2 is a block diagram that schematically illustrates a communication system, in which remote management is carried out in accordance with an embodiment of the invention.

FIG. 2 is a block diagram that schematically illustrates a communication system 48, in which remote management is carried out in accordance with an embodiment of the invention. In this example, host device 34 communicates with an automotive Ethernet network 50, which is deployed in a vehicle 52. Network 50 includes network switch 20, as described above, as well as other network switches 54 and 56. Host device 34 communicates with network 50 via an external network, for example a public or private network, which includes switches 58 and 60.

The switches in system 48 may have respective RMUs, which operate in a manner similar to RMU 22 as described above. Such switches are referred to as "RMU-aware" switches. Other switches may be "RMU-unaware," meaning that they do not contain an RMU or that they contain an RMU that does not support the authentication and encryption functions that are described herein. For example, switches 20, 54 and 60 may be RMU-aware, while switches 56 and 58 are RMU-unaware. Because remote access request and response frames have standard Ethernet frame headers (with the addition of a remote management (RM) tag), however, the RMU-unaware switches will still forward the remote access request and response frames transparently to their destinations. Thus, for example, switch 58 will forward remote access request and response frames between host device 34 and switch 20.

Figure 3:
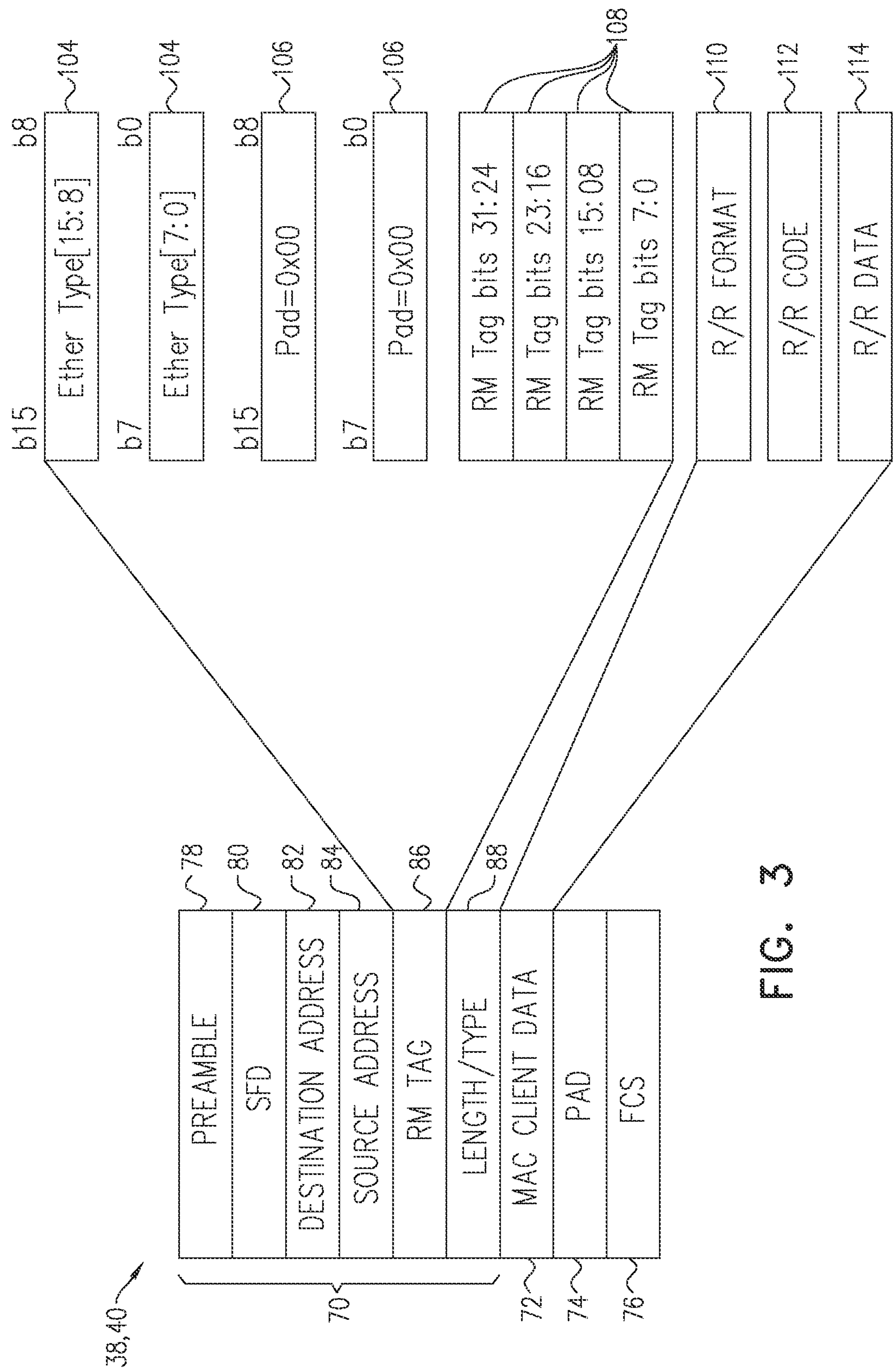
FIG. 3 is a block diagram that schematically illustrates a network management frame for transmission over a network, in accordance with embodiments of the invention.

FIG. 3 is a block diagram that schematically shows details of remote access request frame 38, in accordance with an embodiment of the invention. Remote access response frame 40 has a similar structure. Frame 38 has the form of a standard Ethernet frame, including a header 70, a payload 72, padding 74 (which is optional), and a frame check sequence (FCS) 76. Payload 72 contains MAC client data that is directed to RMU 22 and is therefore encrypted, at least in part. In accordance with network protocols compliant with Ethernet standards, header 70 begins with a preamble 78, followed by a start frame delimiter (SFD) 80, a MAC destination address 82, and a MAC source address 84. A remote management (RM) tag 86 marks frame 38 as a remote access request frame, in the present embodiment. Header 70 concludes with a length/type field 88.

RM tag 86 in this embodiment begins with an Ethertype field 104, comprising two octets having values that are predefined to indicate the protocol that is encapsulated in the payload of the frame. This field is followed by padding octets 106 and a RM tag field 108. Host device 34 sets a predefined set of bits in RM tag field 108 to indicate that this is a remote access request frame. Alternatively, these bits may be set to another value to indicate that this is a remote access response frame, while still other values signal other functionalities, which are beyond the scope of the present description. RM tag field 108 may also contain other information, for example target device bits to indicate whether frame 38 is directed to this RMU 22 (or to the RMU of another switch in the network), as well as a message sequence number.

When frame 38 is received by port 24 of switch 20 (assuming the switch to be RMU-aware), ingress logic in the port checks header 70 to determine whether destination address 82 is the address of this switch and checks RM tag 86 to determine whether this is a remote access request targeting RMU 22. Switch 20 is thus able to ascertain whether to pass the frame to RMU 22 for further processing or to forward it to another switch downstream in the network. If both checks are positive, port 24 forwards the frame to RMU 22 for further processing. Otherwise, the frame is forwarded normally by processing circuitry 28. The structure and usage of the remaining fields in DSA tag 86 are beyond the scope of the present description.

Upon receiving frame 38 from port 24, RMU 22 authenticates and decrypts the MAC client data in payload 72, as described further hereinbelow. In the example shown in FIG. 3, the MAC client data includes a request/response (R/R) format field 110, indicating the structure of the data in payload 72, followed by an R/R code 112, indicating the RMU request type, and R/R data 114. Alternatively, other sorts of client data structures may be used in payload 72. RMU 22 parses at least an initial part (for example, the first six bytes) of the MAC client data to identify the type of the RMU request frame and the registers that should be accessed in servicing the request. RMU 22 will then construct remote access response frame 40 with the information fetched from the registers, encrypt at least a part of the frame payload, and transmit the frame back to host device 34 via port 24.

Like remote access request frame 38, remote access response frame 40 has the form of a standard Ethernet frame, including the fields shown in FIG. 3 and described above. In this case, payload 72 contains MAC client data that has been encrypted by RMU 22. RMU 22 sets RM tag field 108 to indicate that this is a remote access response frame, and sets destination address 82 to the address of host device 34. Port 24 will then forward the frame to the host device over network 26.

Figure 4:
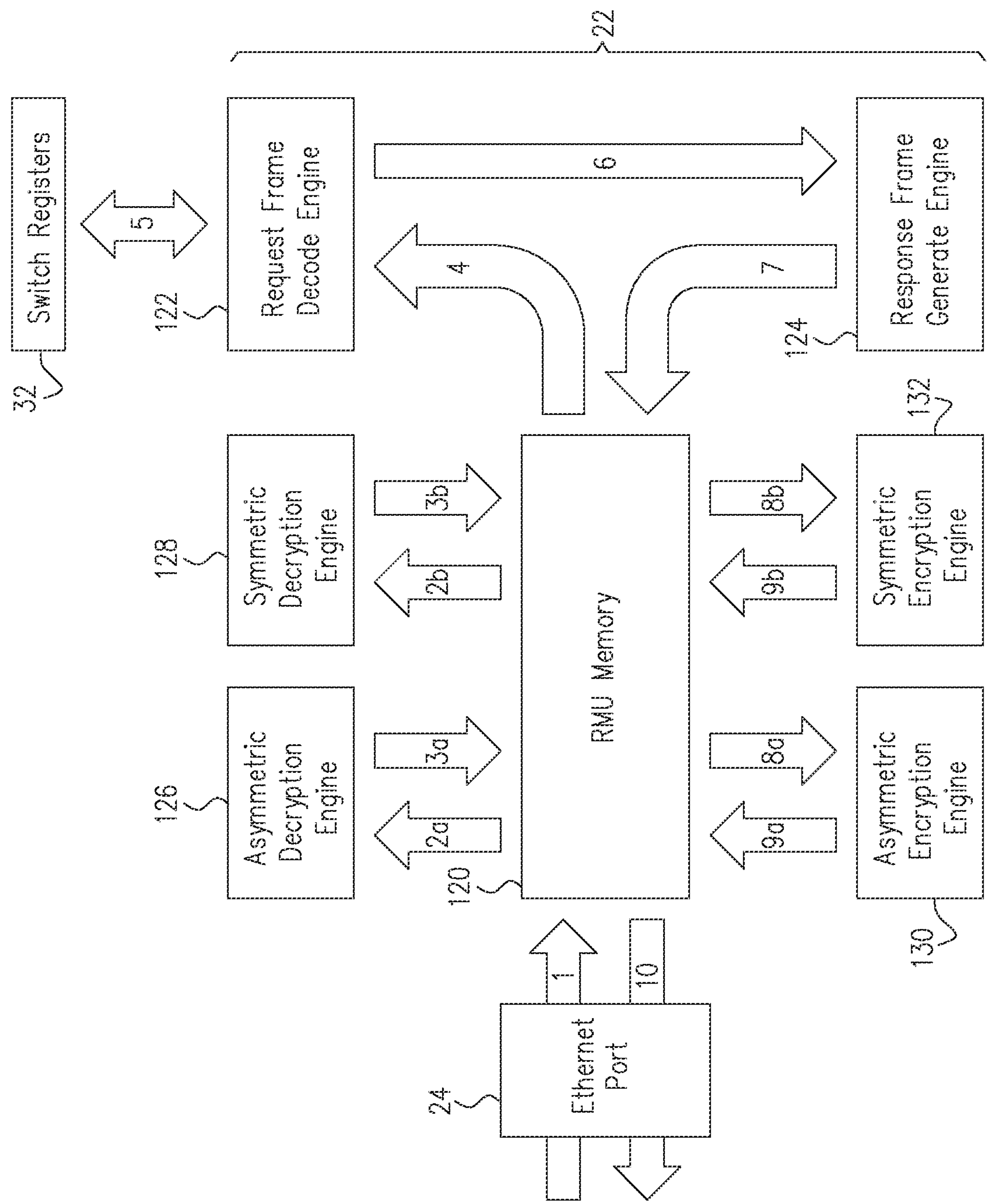
FIG. 4 is a block diagram that schematically illustrates the operation of remote management circuitry in carrying out secure communications, in accordance with an embodiment of the invention.

FIG. 4 is a block diagram that schematically illustrates the operation of RMU 22 in carrying out secure communications, in accordance with an embodiment of the invention. The steps in the operation are numbered sequentially from 1 (receipt of remote access request frame 38 from a network through port 24) through 10 (transmission of remote access response frame 40 to the network through port 24). FIG. 4 focuses particularly on cryptographic operations carried out by RMU 22 for purposes of authentication and prevention of eavesdropping. These operations combine asymmetric-key cryptography for purposes of authentication and symmetric-key cryptography for encryption and decryption. In the present embodiment, the operations of RMU are implemented purely in hardware and/or firmware and do not rely on or involve any CPU (even if switch 20 contains a CPU for other purposes).

Remote access request frame 38 is received through port 24 into an RMU memory 120. When trusted operation is not required, the frame is passed (arrow 4) directly to a request frame decode engine 122, which processes the stored request frame and accesses switch registers 32 to apply new configuration parameters and/or fetch device status parameters (arrow 5). Request frame decode engine 122 passes the relevant data (arrow 6) to a response frame generate engine 124, which constructs remote access response frame 40 and stores it in RMU memory 120 (arrow 7). When the construction of response frame 40 is completed, the frame is read out from RMU memory 120 and transmitted via ethernet port 24 (arrow 10).

When RMU 22 is configured for trusted operation, the stored request frame is first authenticated and/or decrypted by an asymmetric decryption engine 126 and/or a symmetric decryption engine 128 (arrows 2*a*/3*a* and/or 2*b*/3*b*) before processing by request frame decode engine 122. If the frame is decrypted correctly and verified to be from an authenticated host device, decryption engine 126 and/or 128 instructs both request frame decode engine 122 and response frame generate engine 124 to proceed with the processing the frame. Otherwise, the decryption engine informs request frame decode engine 122 that no further processing is required and instructs response frame generate engine 124 to construct an error response frame to indicate the failure of the decryption and/or authentication process.

If decryption and authentication are successful, response frame generate engine 124 will construct response frame 40 and store the response frame in RMU memory 120. An asymmetric encryption engine 130 and/or a symmetric decryption engine 132 will encrypt at least a part of the payload of the response frame (arrows 8*a*/9*a* and/or 8*b*/9*b*) before transmission of the frame through port 24.

By using asymmetric key cryptography, an initial request frame 38 can be used to set up trusted communication between host device 34 and PRU 22. This initial request frame 38 can be used to convey the public key of host device 34 in plaintext (i.e., in unencrypted form) and contains only device-insensitive information. This information includes, for example, the type of RMU request frame (to indicate that the request frame is for setup of trusted communication) and some data that have been encrypted using the private key of the host device to prove that the public key conveyed in the frame is correct.

Upon identifying that the request frame is directed to trusted communication setup, RMU 22 passes the encrypted data in the frame to asymmetric decryption engine 126, which decrypts the encrypted data using the public key conveyed in the request frame. RMU 22 may perform one or more checks to verify the public key verification: For example, the RMU may compare the decrypted data to a plaintext version of the data. Additionally or alternatively, the RMU may compare the public key itself to a value that is pre-stored in RMU 22, for example in memory 120. These comparisons may be applied to the actual data and key, or they may be applied using hash values generated by a predefined hashing algorithm. Devices connected to network 26 may be able to intercept request frame 38 and to extract the value of the public key and the decrypted data; but they cannot forge a different request frame if they do not have the private key that was used by host device 34 in encrypting the data. Thus, checking the decrypted data proves that the public key does correspond to the private key used by the host device for encryption, while checking the public key itself can ensure that the public key belongs to an authenticated host device (assuming that only this host has the pair of private and public keys).

When this public key verification procedure passes successfully, RMU 22 sends response frame 40 via port 24 to acknowledge acceptance of the trusted communication setup. Otherwise, the RMU sends a response frame to indicate that trusted communication setup has failed.

As part of response frame 40 indicating acceptance of trusted communications, asymmetric encryption engine 130 may secure by way of encryption device-sensitive information in the payload of frame 40 using the public key received in request frame 38. As a result, only host device 34 will be able to decrypt the encrypted information using its private key. Other devices without knowledge of the private key cannot decrypt the response frame. The encrypted information in response frame 40 also includes a symmetric encryption key for use by host device 34 and RMU 22 in subsequent trusted data exchange. This symmetric key may be generated at random, for example, by RMU 22. In addition, symmetric encryption engine 132 may encrypt a secret identifier belonging to RMU 22, using the symmetric key. Asymmetric encryption engine 130 encrypts both the symmetric key and the symmetrically-encrypted secret identifier, and RMU 22 inserts the resulting ciphertext in the payload of response frame 40.

When host device 34 receives this response frame 40 confirming the setup of trusted communications, it decrypts the payload using its own private key, and thus recovers the symmetric key and the symmetrically-encrypted secret identifier. Host device 34 then uses the recovered symmetric key in decrypting the actual secret identifier. Host device 34 compares the secret identifier (or its hash value) to a prestored value held by the host device. Because this secret identifier is encrypted both with the public key of the host device and with the randomly-generated symmetric key, other devices will not be able to generate bogus response frames with a different symmetric key without knowing the secret identifier. Thus, host device 34 can readily verify that the trusted communication setup response frame came from RMU 22 of switch 20.

At this point, the setup of trusted communication between host device 34 and RMU 22 is completed. The host device and RMU subsequently use the symmetric key to secure the transmission of request frames 38 and response frames 40 containing device-sensitive data. Host device 34 may periodically send a new request frame to set up trusted communication after a certain period of secure communication, in order to restart the trusted communication setup process. In this case, RMU 22 will generate another random symmetric key for subsequent communications.

Figure 5:
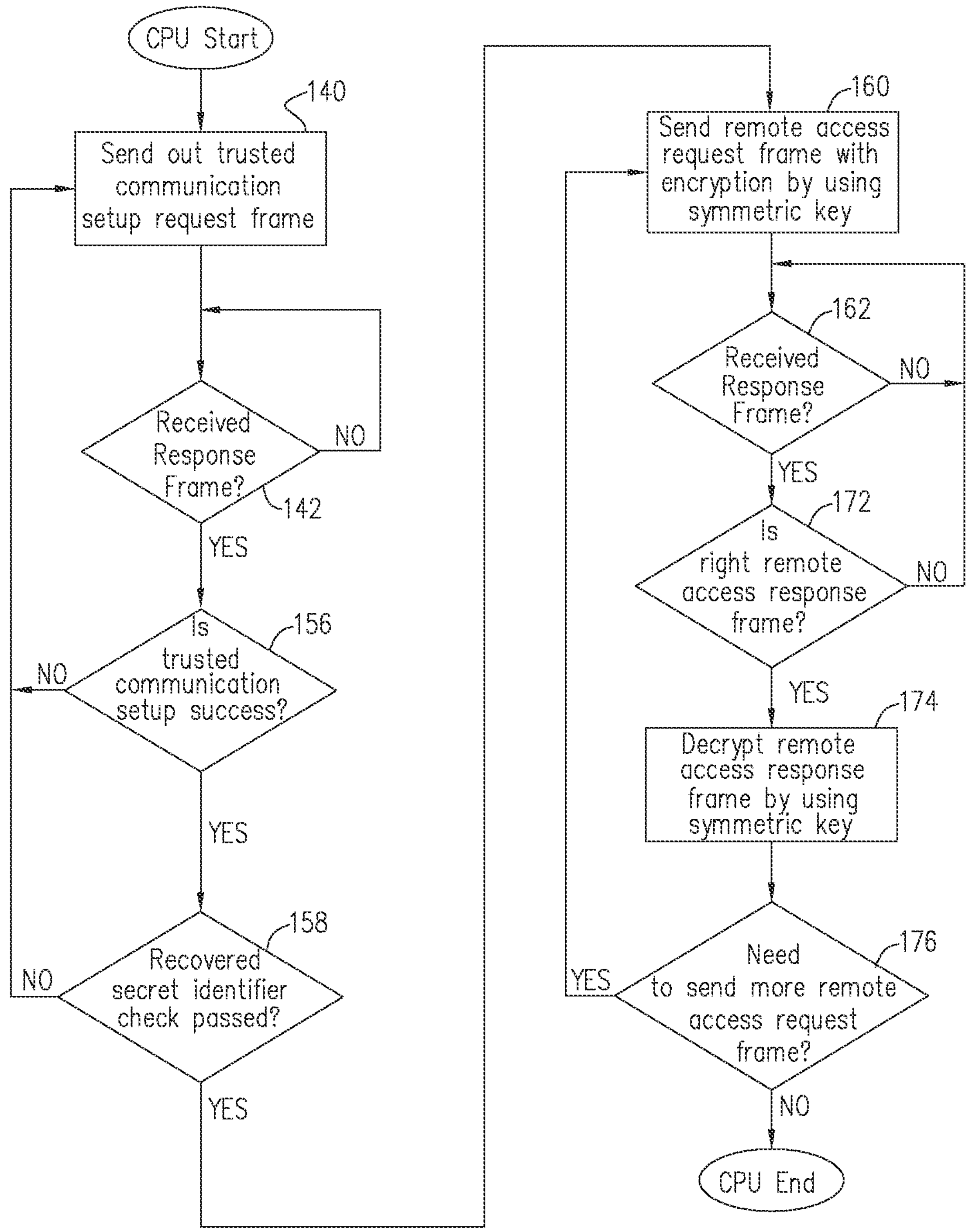
FIGS. 5 and 6 are flow charts that schematically illustrate a method for secure communication between a host device and remote management circuitry, in accordance with an embodiment of the invention.
Figure 6:
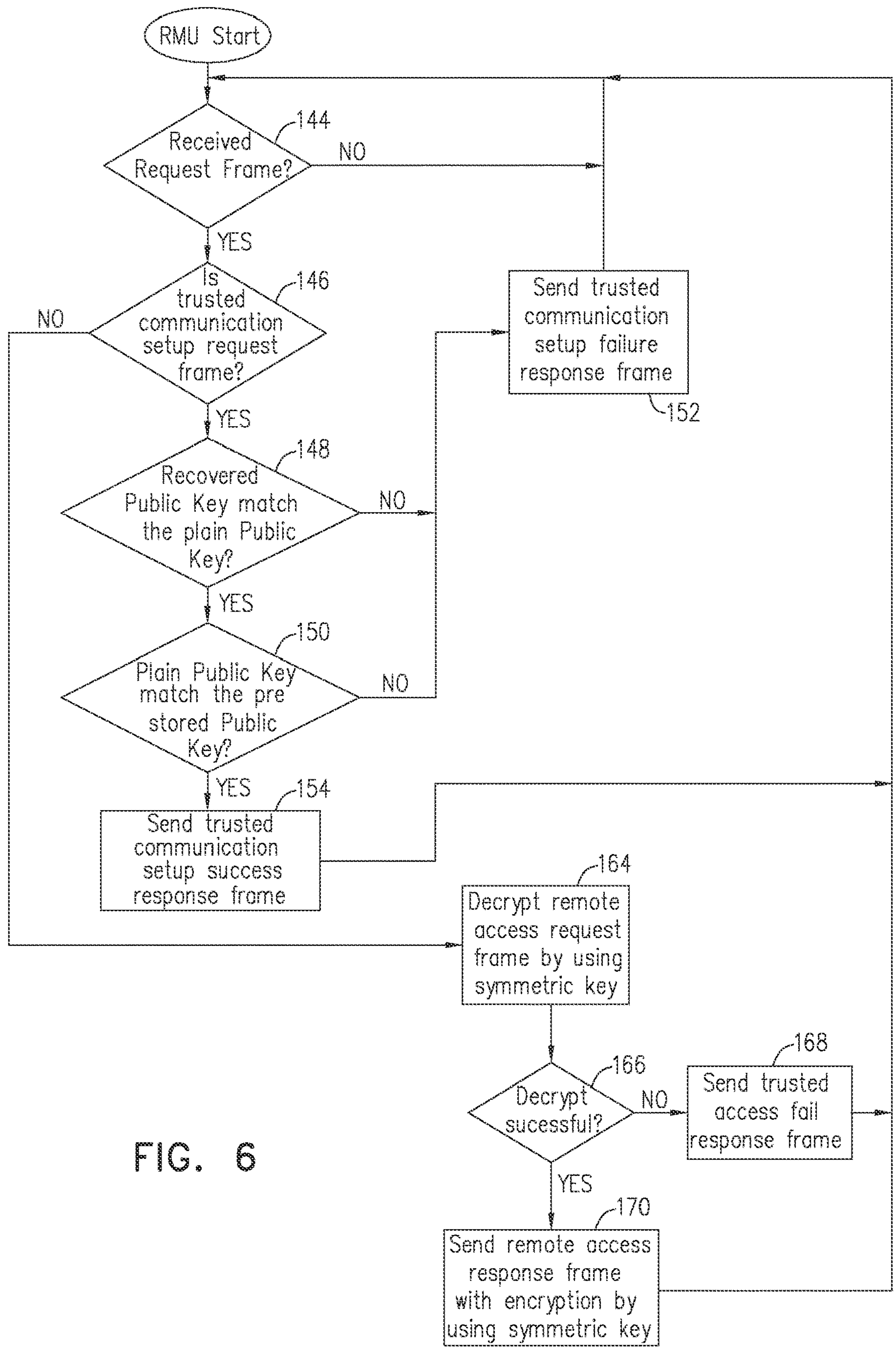

FIGS. 5 and 6 are flow charts that schematically illustrate a method for secure communication between CPU 36 of host device 34 and RMU 22 in switch 20, in accordance with an embodiment of the invention. FIG. 5 illustrates the parts of the method carried out by CPU 36, while FIG. 6 illustrates the parts carried out by PRU 22.

CPU 36 transmits a remote access request frame requesting setup of trusted communications, at a setup initiation step 140. This frame contains the public key of host device 34 and data encrypted using the corresponding private key, as explained above. CPU 36 then waits for a response frame, at a response reception step 142.

PMU 22 meanwhile awaits reception of a remote access request frame, at a request reception step 144. Upon receiving such a frame, the RMU checks whether it is a setup request frame, at a setup checking step 146. If so, RMU 22 decrypts the data in the frame using the public key, to verify the correctness of the key, at a decryption step 148. RMU 22 also compares the public key value to a pre-stored value held by the RMU, at a key checking step 150. If either of these steps fails, PMU 22 will send a remote access response frame indicating that trusted communications setup has failed, at a failure notification step 152. Otherwise, RMU 22 sends a remote access response frame indicating that trusted communications setup has succeeded, at a success notification step 154. In this latter case, the response frame contains a symmetric encryption key and a secret identifier, which are encrypted using the public key of host device 34, as explained above.

CPU 36 receives the response sent by RMU 22 (at either step 152 or step 154), and checks whether the response indicates that setup has been successful, at a success checking step 156. If the response indicates successful setup, CPU 36 checks the secret identifier against a value that is prestored in the memory of host device 34, at an identifier check step 158. If either of steps 156 and 158 is unsuccessful, CPU 36 may return to step 140 to retry the setup process.

When setup of trusted communications has succeeded, CPU 36 sends a remote access request frame to RMU, with payload data encrypted using the symmetric key, at a request transmission step 160. CPU 36 then waits for a response frame, at a response reception step 162.

Upon receiving this request frame, RMU 22 decrypts the frame payload using the symmetric key, at a decryption step 164. RMU 22 checks whether decryption succeeded, at a decryption checking step 166. If not, RMU 22 sends a remote access response frame to host device 34 indicating a trusted access failure, at a failure reporting step 168. When decryption is successful, RMU 22 accesses registers 32 as required and then sends a corresponding remote access response frame to host device, at a response step 170. The contents of the payload of this frame are also encrypted using the symmetric key.

CPU 36 receives the response sent by RMU 22 (at either step 168 or step 170), and checks the header to verify that it is the expected response frame, at a response checking step 172. Assuming the response frame is correct, CPU 36 decrypts the response payload using the symmetric key, at a decryption step 174, and records the results as appropriate. CPU 36 checks whether further remote access to RMU 22 is required, at an access checking step 176. If so, the process returns to step 160. Otherwise, the remote access session ends.

The embodiments described above are cited by way of example, and the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A network switch, comprising:

a plurality of ports for communicating over a network;

processing circuitry, separate from a central processing unit (CPU), the processing circuitry configured to process inbound frames received from the network via the ports and to send outbound frames to the network via the ports; and remote management circuitry (RMU) that is responsive to commands received from a host device eternal to the network switch, the RMU being separate from the CPU and configured to:

receive via one of the ports a remote access request frame from the host device, wherein at least part of the remote access request frame is encrypted;

decrypt the remote access request frame; and in response to successful decryption of the part of the remote access request frame, access, independently of accessing any CPU, one or more configuration registers of the network switch in accordance with the remote access request frame, compose a remote access response frame, at least a portion of the remote access response frame being encrypted, and send the remote access response frame to the host device.

2. The network switch according to claim 1, wherein the remote management circuitry is configured to decrypt the part of the remote access request frame, and to encrypt the portion of the remote access response frame, independently of any CPU.

3. The network switch according to claim 1, wherein the network switch is disposed on one or more integrated circuits that are absent CPU circuitry.

4. The network switch according to claim 1, wherein the remote access request frame further carries authentication information, and wherein the remote management circuitry is configured to authenticate the host device using the authentication information, and to compose the remote access response frame only in response to both (i) successful decryption of the part of the remote access request frame, and (ii) successful authentication of the host device.

5. The network switch according to claim 4, wherein the remote management circuitry is configured to authenticate the host device using an asymmetric ciphering scheme and to decrypt one or more subsequent remote access request frames using a symmetric ciphering scheme.

6. The network switch according to claim 5, wherein the remote management circuitry is configured to extract a public encryption key of the host device from the remote access request frame, to Generate a symmetric encryption key for use in encrypting and decrypting the one or more subsequent remote access request frames, to encrypt the symmetric encryption key using the pub is encryption key in the asymmetric ciphering scheme, and to transmit the encrypted symmetric encryption key to the host device in the remote access response frame.

7. The network switch according to claim 1, wherein the network is an automotive network in a vehicle, and wherein the remote management circuitry is configured to receive the remote access request frame from outside the vehicle or from within the vehicle.

8. The network switch according to claim 1, wherein the network is an industrial network.

9. The network switch according to claim 1, wherein the network is an enterprise network.

10. A method for remote access in a network switch, the method comprising:

receiving, via a port of the network switch, a remote access request frame from a host device external to the network switch, wherein at least part of the remote access request frame is encrypted;

decrypting the remote access request frame separately from any central processing unit (CPU); and in response to successful decryption of the part of the remote access request frame, performing independently of accessing any CPU:

accessing one or more configuration registers of the network switch in accordance with the remote access request frame;

composing a remote access response frame;

encrypting at least a portion of the remote access response frame; and sending the remote access response frame to the host device.

11. The method according to claim 10, wherein decrypting the remote access request frame and encrypting at least the portion of the remote access response frame comprise performing decryption and encryption operations in the network switch independently of any CPU.

12. The method according Co claim 10, wherein the remote access request frame further carries authentication information, and wherein the method further comprises authenticating the host device using the authentication information, and composing the remote access response frame only in response to both (i) successful decryption of the part of the remote access request frame, and (ii) successful authentication of the host device.

13. The method according to claim 12, wherein authenticating the host device comprises applying an asymmetric ciphering scheme to authenticate the host device, and wherein the method comprises applying a symmetric ciphering scheme in decrypting one or more subsequent remote access request frames received from the host device.

14. The method according to 13, wherein applying the asymmetric ciphering scheme comprises extracting a public encryption key of the host device from the remote access request frame, and wherein applying the symmetric ciphering scheme comprises generating a symmetric encryption key for use in encrypting and decrypting the one or more subsequent remote access request frames, encrypting the symmetric encryption key using the public encryption key in the asymmetric ciphering scheme, and transmitting the encrypted symmetric encryption key to the host device in the remote access response frame.

15. The method according to claim 10, and comprising deploying the network switch in an automotive network in a vehicle, wherein receiving the remote access request frame comprises receiving one or more remote access request frames from outside the vehicle or from within the vehicle.

16. According to claim 10, and comprising deploying the network switch in an industrial network.

17. The method according to claim 10, and comprising deploying the network switch in an enterprise network.

* * * * *